United States Patent
Park et al.

(10) Patent No.: US 10,495,907 B2
(45) Date of Patent: Dec. 3, 2019

(54) LIQUID CRYSTAL DISPLAY DEVICE

(71) Applicant: LG DISPLAY CO., LTD., Seoul (KR)

(72) Inventors: Yongseok Park, Goyang-si (KR); Hyelim Ji, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 50 days.

(21) Appl. No.: 15/693,053

(22) Filed: Aug. 31, 2017

(65) Prior Publication Data

US 2018/0059459 A1    Mar. 1, 2018

(30) Foreign Application Priority Data

Aug. 31, 2016 (KR) ......................... 10-2016-0112166

(51) Int. Cl.
| | |
|---|---|
| *G02F 1/1333* | (2006.01) |
| *G02F 1/133* | (2006.01) |
| *G02F 1/1335* | (2006.01) |
| *G02F 1/1343* | (2006.01) |
| *G02F 1/1368* | (2006.01) |
| *G02F 1/1345* | (2006.01) |
| *G02F 1/1362* | (2006.01) |

(52) U.S. Cl.
CPC ........ *G02F 1/13306* (2013.01); *G02F 1/1368* (2013.01); *G02F 1/13439* (2013.01); *G02F 1/13454* (2013.01); *G02F 1/133345* (2013.01); *G02F 1/133512* (2013.01); *G02F 1/136209* (2013.01); *G02F 2201/121* (2013.01)

(58) Field of Classification Search
CPC .................................................. G02F 1/13454
See application file for complete search history.

(56) References Cited

U.S. PATENT DOCUMENTS

| | | | |
|---|---|---|---|
| 2002/0145683 A1* | 10/2002 | Murade | G02F 1/13454 349/43 |
| 2016/0013264 A1* | 1/2016 | Yoshii | H01L 29/78621 257/344 |
| 2018/0031891 A1* | 2/2018 | Yang | G02F 1/133345 |

FOREIGN PATENT DOCUMENTS

KR      2015-0124925 A      11/2015

* cited by examiner

*Primary Examiner* — Richard H Kim
(74) *Attorney, Agent, or Firm* — Seed Intellectual Property Law Group LLP

(57) ABSTRACT

Disclosed herein is a liquid crystal display device capable of improving reliability of a gate in panel (GIP) type gate driving circuit by improving positive bias temperature stress (PBTS) characteristics of a thin film transistor in the gate driving circuit. The liquid crystal display device may include a first substrate including a thin film transistor of a GIP circuit, and an opaque electrode line that overlaps a semiconductor active layer of the thin film transistor. A backlight unit is included, and a second substrate is positioned between the backlight unit and the first substrate. The second substrate includes a black matrix having an opening that transmits light emitted from the backlight unit. In operation, the opaque electrode line blocks a portion of the light transmitted through the opening of the black matrix, and another portion of the light transmitted through the opening of the black matrix is transmitted to the semiconductor active layer.

19 Claims, 8 Drawing Sheets

(RELATED ART)

LIQUID CRYSTAL DISPLAY DEVICE

CROSS-REFERENCE TO RELATED APPLICATION

This disclosure claims the benefit of priority under 35 U.S.C. § 119(a) to Republic of Korea Patent Application No. 10-2016-0112166 filed on Aug. 31, 2016, the entire contents of which is incorporated herein by reference for all purposes as if fully set forth herein.

BACKGROUND

Technical Field

This disclosure relates to a liquid crystal display device, and more particularly to a liquid crystal display device having a gate drive circuit of a GIP (Gate In Panel) type.

Description of the Related Art

A flat panel display device may include a liquid crystal display device (LCD), a plasma display panel (PDP), an organic light emitting diode (OLED) display device, an electrophoretic display device (EPD) and so on.

The liquid crystal display includes a display panel in which liquid crystal molecules having an intermediate state between a liquid and a solid are positioned between two substrates. The liquid crystal display reproduces an input image by changing the arrangement of the liquid crystal molecules according to the video data of the input image and adjusting the amount of light passing through the display panel according to the gray value of the video data.

The liquid crystal display device of an active matrix driving method displays a moving image by using thin film transistors as switching elements. A display panel of the liquid crystal display device includes data lines, gate lines (or scan lines) and pixels formed in pixel regions in the form of a matrix defined by the data lines and the gate lines.

The pixels of the liquid crystal display device include thin film transistors which are located adjacent to the crossings of the data lines and the gate lines. The thin film transistors supply the data voltage from the data lines to pixel electrodes of liquid crystal cells in response to gate pulses from the gate lines. The liquid crystal cell is driven by an electric field generated according to a voltage difference between a voltage of a pixel electrode and a common voltage applied to a common electrode to control the amount of light passing through a polarizer. A storage capacitor is connected to the pixel electrode of the liquid crystal cell to maintain the voltage of the liquid crystal cell.

Driving circuits of the liquid crystal display device include a data driving circuit for supplying data signals to the data lines of a pixel array, a gate driving circuit for sequentially supplying the gate pulses (or the scanning pulses) to the gate lines of the pixel array in synchronized with the data signals, and a timing controller for controlling the data driving circuit and the gate driving circuit, and the like. The timing controller controls the gate driver circuit (or the scan driver circuit) to sequentially supply the data to the gate lines (or scan lines).

Each of the pixels may include a thin film transistor that supplies the data voltage from the data line to the pixel electrode in response to the gate pulse. The gate pulse swings between a gate high voltage VGH and a gate low voltage VGL. The gate high voltage VGH is set to a voltage higher than a threshold voltage of the thin film transistor and the gate low voltage VGH is set to a voltage lower than the threshold voltage of the thin film transistor.

Recently, a technique of embedding a gate driving circuit in the display panel together with the pixel array has been applied. The gate drive circuit built in the display panel is known as a GIP (Gate In Panel) circuit. The GIP circuit includes a shift register. The shift register includes a plurality of stages connected in a cascade manner. Each stage includes a plurality of thin film transistors (TFTs) to generate an output in response to a start pulse and to shift the output according to a shift clock.

Hereinafter, a related art liquid crystal display device will be described with reference to FIGS. 1 and 2.

Figure 1:
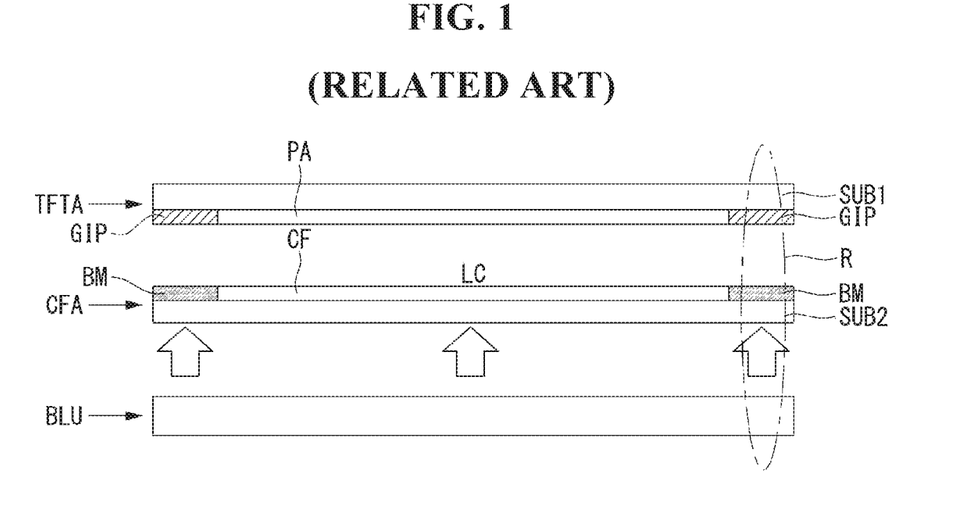
FIG. 1 is a cross-sectional view schematically showing a related art liquid crystal display device.
Figure 2:
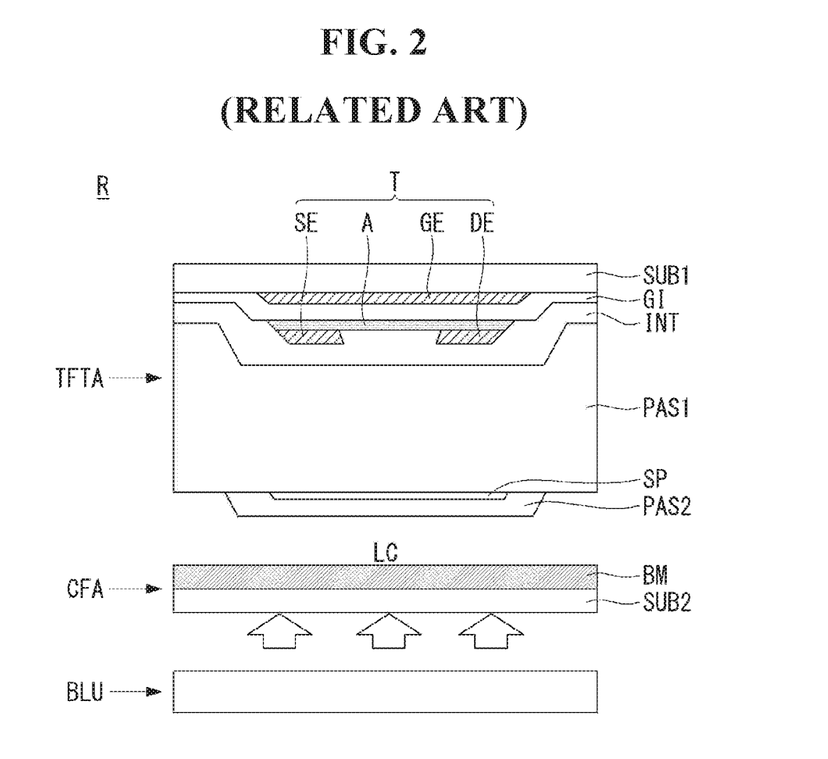
FIG. 2 is a cross-sectional view showing a region R of FIG. 1 in greater detail.

FIG. 1 is a cross-sectional view schematically showing a related art liquid crystal display device, and FIG. 2 is a cross-sectional view showing a region R of FIG. 1 in greater detail.

Referring to FIG. 1, the related art liquid crystal display device includes a thin film transistor array TFTA and a color filter array CFA arranged opposite to each other with a liquid crystal layer LC interposed therebetween, and a backlight unit BLU for irradiating light under the color filter array CFA.

The thin film transistor array TFTA includes a pixel array PA arranged in an active region of a first substrate SUB1 and a GIP Circuit GIP arranged in a bezel region outside the active region to supply the gate signals to the pixel array PA.

The color filter array CFA includes a color filter layer CF disposed on a second substrate SUB2 corresponding to the pixel array PA and a black matrix BM disposed outside the color filter layer CF corresponding to the GIP circuit GIP.

The backlight unit BLU is disposed under the second substrate SUB2 of the color filter array CFA and emits light to the color filter array CFA.

As shown in FIG. 1, the black matrix BM of the color filter array CFA is configured to overlap the GIP circuit GIP of the thin film transistor array TFTA. Referring to FIG. 2 which is an enlarged view showing a region R of FIG. 1, the black matrix BM is overlapped with the GIP circuit GIP. Accordingly, the black matrix BM blocks the light supplied from the backlight unit BLU from being supplied to the plurality of thin film transistors T constituting the GIP circuit GIP.

Referring to FIG. 2, each thin film transistor T included in the GIP circuit GIP includes a gate electrode GE disposed on the first substrate SUB1, an active layer A disposed on a gate insulation layer covering the gate electrode GE so as to overlap the gate electrode GE, and a source electrode SE and a drain electrode DE arranged separately from each other on the active layer A. An interlayer insulating layer INT covers the source electrode SE and the drain electrode DE of the thin film transistor T. A first passivation layer PAS1 is laminated on the interlayer insulating layer INT. A transparent electrode SP is disposed on the first passivation layer PAS1 and a second passivation layer PAS2 is disposed to cover the transparent electrode SP.

In the liquid crystal display device described above, the black matrix BM completely covers the GIP circuit GIP. That is, the black matrix BM has an area that is larger than that of the GIP circuit, such that the black matrix BM completely overlaps the GIP circuit GIP between the backlight unit BLU and the GIP circuit GIP. Accordingly, the light emitted from the backlight unit BLU is absorbed by the black matrix BM, so that the light cannot reach the thin film transistor T.

Since the active layer A constituting the thin film transistor T, such as a switching TFT connected to a Q node or a QB node of the GIP circuit GIP, should have a good off-current characteristic, oxide semiconductors such as Indium Gallium Zinc Oxide (IGZO) may be used. However, such oxide semiconductors have a high dependency on a positive bias temperature stress (PBTS) characteristic, and if the active layer is formed by using the oxide semiconductor, the PBTS characteristic is deteriorated when light is blocked.

Figure 3A:
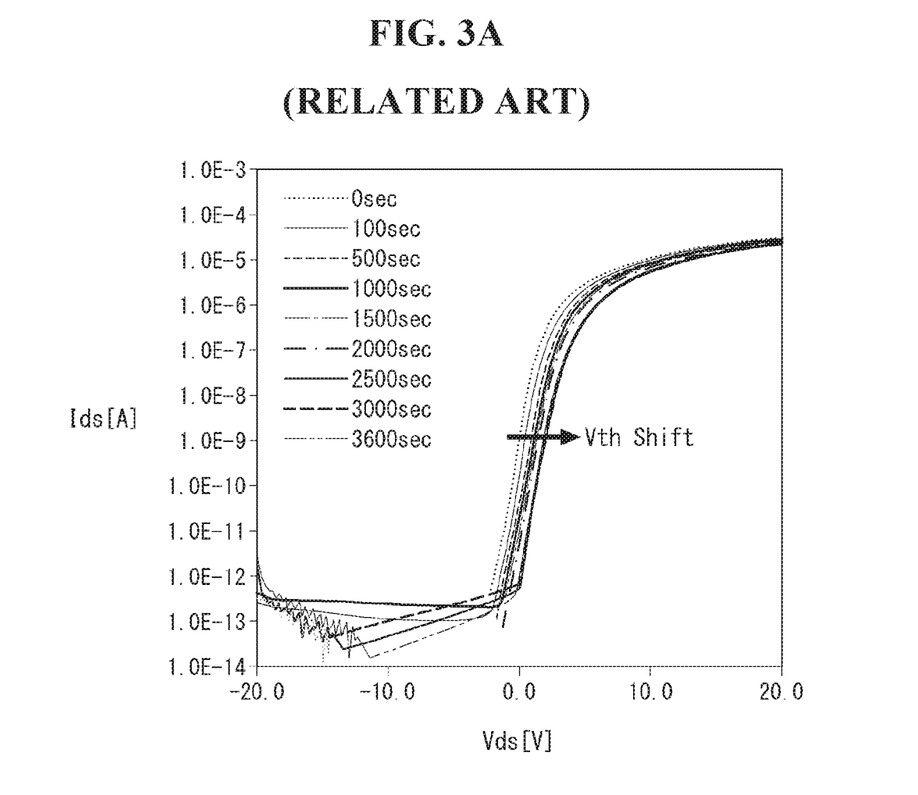
FIG. 3A is a graph showing a variation of a threshold voltage value of a thin film transistor T of a GIP circuit according to a positive bias temperature stress (PBTS) characteristic in a state in which no light is applied.
Figure 3B:
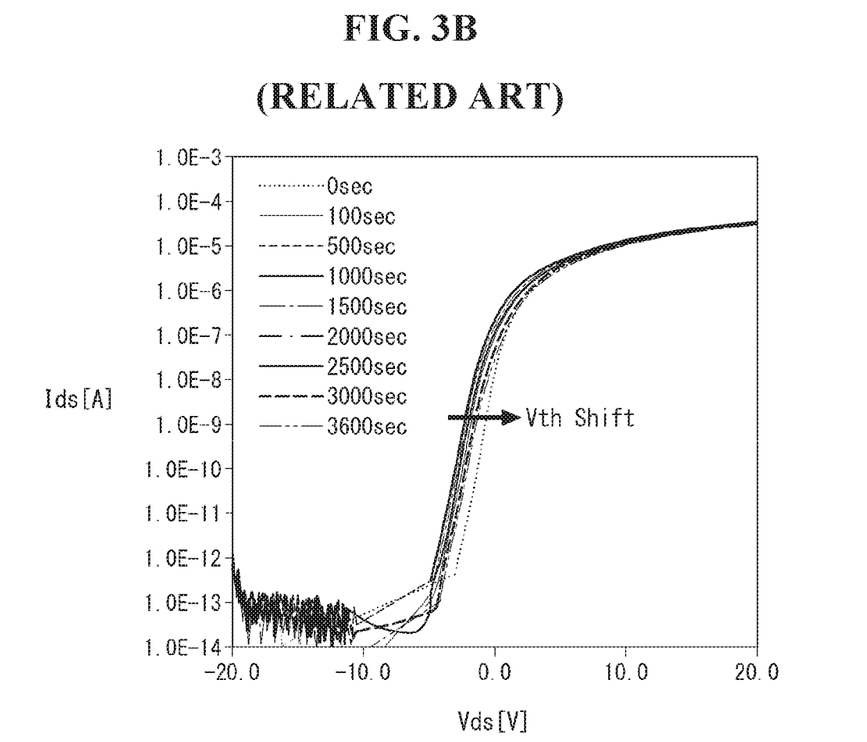
FIG. 3B is a graph showing a variation of a threshold voltage value of a thin film transistor T of a GIP circuit according to a positive bias temperature illumination stress (PBTIS) in a state in which light is applied.

Referring to FIGS. 3A and 3B, the influence of light irradiation on a thin film transistor using an oxide semiconductor will be described in more detail.

FIG. 3A is a graph showing a variation of a threshold voltage value of a thin film transistor T of a GIP circuit according to a PBTS characteristic in a state in which no light is applied. FIG. 3B is a graph showing a variation of a threshold voltage value of a thin film transistor T of a GIP circuit according to a positive bias temperature illumination stress (PBTIS) in a state which light is applied.

Referring to FIG. 3A, the threshold voltage value of the thin film transistor T of the GIP circuit according to the PBTS characteristic of FIG. 3A was shifted by 2.4 V over an elapsed time of about 3,600 seconds. However, the threshold voltage value of the thin film transistor T of the GIP circuit according to the PBTIS characteristic of FIG. 3B was shifted by only about 0.2 V over the same elapsed time of about 3,600 seconds. As a result, it can be seen that the shift amount of the threshold voltage value can be significantly reduced in the case of the thin film transistor T which is irradiated by light.

Therefore, in the related art liquid crystal display device, the shift amount of the threshold voltage value of the thin film transistor of the GIP circuit is increased according to the characteristics of the PBTS, thereby lowering the reliability of the GIP circuit.

BRIEF SUMMARY

In various embodiments, the present disclosure provides a liquid crystal display device capable of reducing a shift amount of a threshold voltage value of a thin film transistor of a GIP circuit to increase reliability of the GIP circuit.

In at least one embodiment, the present disclosure provides a liquid crystal display device that includes a first substrate including a thin film transistor of a GIP circuit disposed in a bezel area positioned outside of an active area on which an image is displayed, and an opaque electrode line that overlaps a semiconductor active layer of the thin film transistor. A backlight unit is included, and a second substrate is provided between the backlight unit and the first substrate. The second substrate includes a black matrix having an opening configured to transmit light emitted from the backlight unit through the second substrate. In operation, the opaque electrode line blocks a portion of the light transmitted through the opening of the black matrix, and another portion of the light transmitted through the opening of the black matrix is transmitted to the semiconductor active layer.

The opening of the black matrix may have a width that is greater than a width of the opaque electrode line.

The width of the opaque electrode line may be substantially equal to a width of the semiconductor active layer.

The light transmitted to the semiconductor active layer may be indirectly transmitted to the semiconductor active layer by reflection or diffraction.

The thin film transistor may be disposed on the first substrate, and the opaque electrode line may be disposed to be in direct contact with a transparent electrode disposed on a passivation layer that covers the thin film transistor.

The transparent electrode may be disposed in the bezel area and electrically isolated from a common electrode disposed in the active area.

The opaque electrode line may apply a gate low voltage to the transparent electrode.

The light transmitted to the semiconductor active layer may be transmitted between edges of the black matrix and side surfaces of both the opaque electrode line.

The light transmitted to the semiconductor active layer may be transmitted between edges of the black matrix and side surfaces of both the opaque electrode line and the transparent electrode.

The thin film transistor may be included in a shift register of the GIP circuit.

In one or more additional embodiments, the present disclosure provides a device that includes a first substrate, and a thin film transistor on the first substrate. The thin film transistor includes an active layer, and source and drain electrodes on the active layer. A portion of the active layer is exposed between the source and drain electrodes. The device further includes a first passivation layer on the thin film transistor, an opaque electrode line on the first passivation layer, a second substrate, and a black matrix on the second substrate. The black matrix is positioned between the second substrate and the opaque electrode line, and includes an opening having a width that is greater than a width of the opaque electrode line.

The device may further include a transparent electrode between the first passivation layer and the opaque electrode line.

The transparent electrode may have a same width as the opaque electrode line, and may be substantially aligned with the opaque electrode line.

The device may further include a second passivation layer on the opaque electrode line, and positioned between the opaque electrode line and the second substrate.

The opaque electrode line may form a light blocking region that blocks light emitted through the opening of the black matrix, and light transmissive regions may be formed between edges of the black matrix that at least partially form the opening and edges of the opaque electrode line.

In still further embodiments, the present disclosure provides a device that includes a first substrate, and a thin film transistor on the first substrate. The thin film transistor includes an active layer, and source and drain electrodes on the active layer, a portion of the active layer being exposed between the source and drain electrodes. The device includes an opaque electrode line overlapping the exposed portion of the active layer, a second substrate, and a black matrix on the second substrate. The black matrix includes an opening that faces the opaque electrode line, and the opening has an area that is greater than an area of the opaque electrode line.

The device may further include a backlight unit, and the second substrate may be positioned between the opaque electrode line and the backlight unit.

In operation, the opaque electrode line may be configured to block a first portion of light emitted by the backlight unit, and a second portion of the light may be transmitted between side surfaces of the black matrix and side surfaces of the opaque electrode line.

The device may further include a passivation layer between the opaque electrode line and the active layer, and the second portion of the light may be transmitted through the passivation layer to the exposed portion of the active layer.

The device may further include a liquid crystal layer between the second substrate and the opaque electrode line.

According to the embodiments provided by the present disclosure, the PBTS characteristic of the thin film transistor is improved since the light supplied from the backlight unit flows into the semiconductor active layer constituting the thin film transistor of the shift register formed in the GIP type gate driving circuit. Accordingly, it is possible to obtain an effect capable of improving the reliability of the gate drive circuit.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Hereinafter, embodiments of the present disclosure are described in detail with reference to the accompanying drawings. In the specification, the same reference symbols denote the same elements. In the following description, a detailed description of known functions and features may be omitted if such detailed description is deemed to obscure the embodiments of the present disclosure. Furthermore, the names of elements used in the following description have been selected for convenience in writing this specification and may be different from the names of actual parts.

Hereinafter, a liquid crystal display device according to one or more embodiments of the present disclosure will be described with reference to FIGS. 4 and 5.

Figure 4:
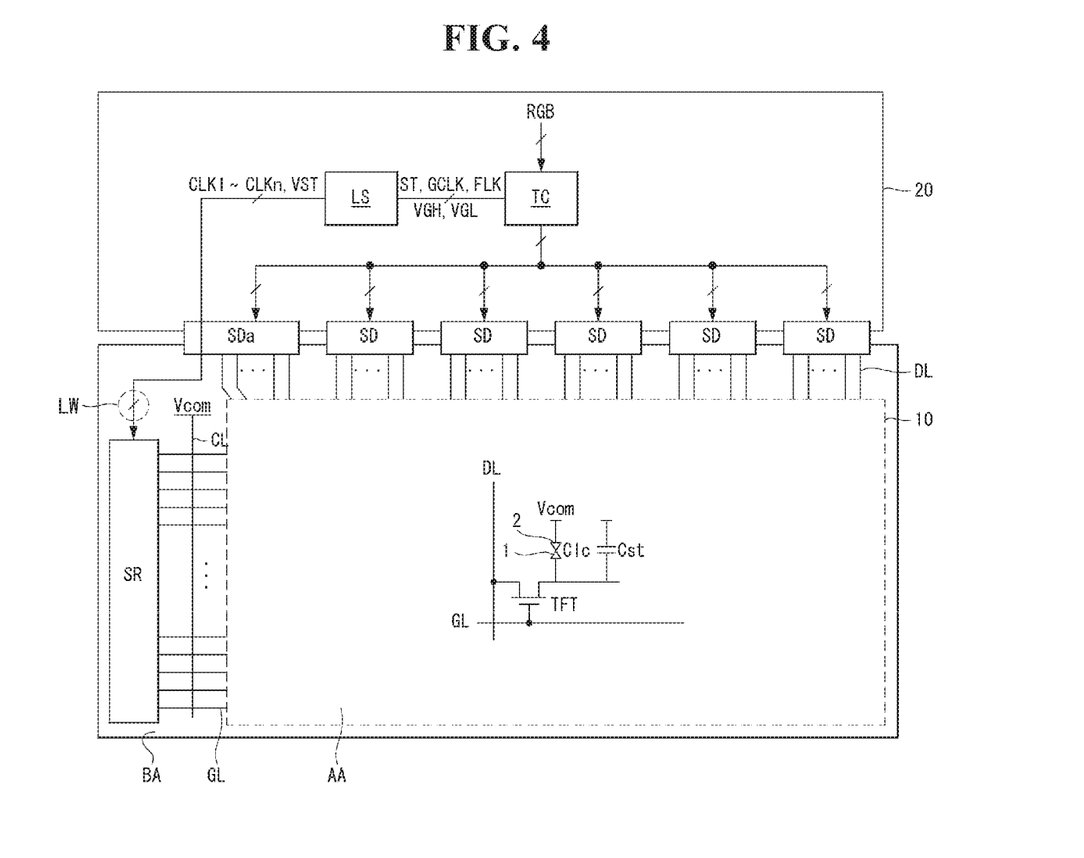
FIG. 4 is a block diagram illustrating a liquid crystal display device according to one or more embodiments of the present disclosure.
Figure 5:
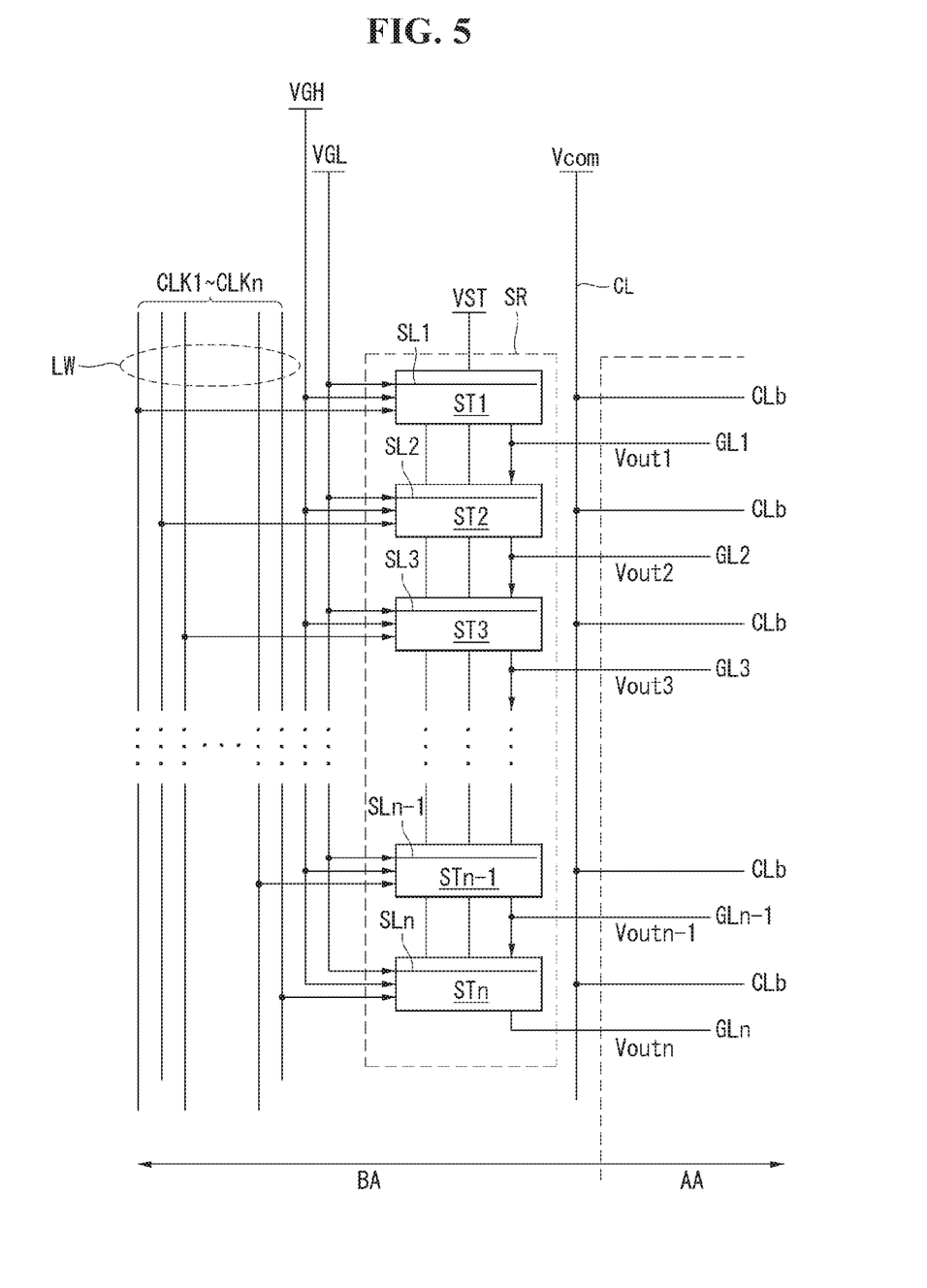
FIG. 5 is a schematic diagram showing a shift register of the GIP circuit shown in FIG. 4.

FIG. 4 is a block diagram illustrating a liquid crystal display device according to one or more embodiments of the present disclosure, and FIG. 5 is a schematic diagram showing a shift register of the GIP circuit shown in FIG. 4 in greater detail.

Referring to FIG. 4, a liquid crystal display device according to one or more embodiments of the present disclosure includes a display panel 10, a data driving circuit, a GIP (Gate In Panel) type gate driving circuit, and a timing controller TC.

The display panel 10 includes an active area AA and a bezel area BA. The active area AA is an area in which a pixel array is disposed and an input image is displayed. The bezel area BA is an area in which a shift register SR and various signal lines of the gate drive circuit, and common voltage supply lines are disposed. The bezel area BA is positioned outside of the active area AA, as shown.

Figure 7:
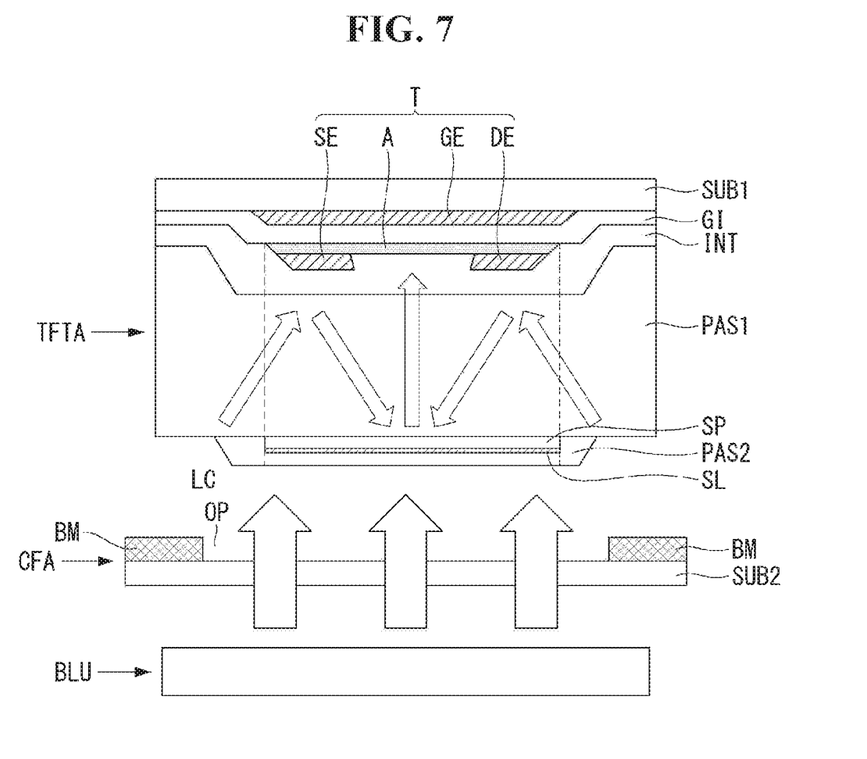
FIG. 7 is a cross-sectional view showing a path through which light is introduced into the thin film transistor of the GIP circuit (e.g., in the shift register) of the liquid crystal display device according to one or more embodiments of the present disclosure.

The pixel array may include a thin film transistor (TFT) array disposed on a first substrate, a color filter array disposed on a second substrate, and liquid crystal cells Clc. The TFT array, color filter array, and the first and second substrates are shown in FIG. 7.

The TFT array includes data lines DL, gate lines (or scan lines) GL crossing over the data lines DL, thin film transistors TFT adjacent to the crossings of the data lines DL and the gate lines GL, pixel electrodes 1 and storage capacitors Cst connected to the thin film transistors TFT, storage capacitors Cst connected to the thin film transistors TFT and so on. On the second substrate of the display panel 10, a color filter array including a black matrix and color filters is disposed. A common electrode 2 may be disposed on the first substrate or the second substrate. The liquid crystal cells Clc are driven by the electric field between the pixel electrodes 1 to which the data voltages are supplied and the common electrode 2 to which the common voltage Vcom is supplied.

The common voltage Vcom may be supplied from a separate power source (not shown) and may be supplied to the common electrode 2 through a common line CL. The common line CL includes a plurality of common line branches CLb (FIG. 5) which branch from the common line CL and extend in a direction that is parallel with respect to the gate lines GL from the bezel area BA into the active area AA.

The display panel 10 may include a color filter on transistor (COT) type color filter array in which a color filter array is not disposed on the second substrate, but is instead disposed on the TFT array.

On the first substrate and the second substrate of the display panel 10, a polarizing plate having an orthogonal optical axis is attached. Also, an alignment film for setting a pretilt angle of the liquid crystal is disposed at the interface abutting the liquid crystal layer. One or more spacers may be disposed between the first substrate and the second substrate of the display panel 10 to maintain a cell gap of the liquid crystal layer.

The data driving circuit includes a plurality of source drive ICs SDa and SD, each of which is connected to a respective group of the data lines DL. The source drive ICs SDa and SD receive digital video data RGB from the timing controller TC. The source drive ICs SDa and SD convert the digital video data RGB into positive or negative polarity analog data voltages in response to a source timing control signal from the timing controller TC, and then supply the data voltages to the data lines DL of the display panel 10 in synchronization with gate pulses (or scan pulses). The source drive ICs SDa and SD may be connected to the data lines DL of the display panel 10 by a chip on glass (COG) process or by a tape automated bonding (TAB) process. The source drive ICs SDa and SD shown in FIG. 4 are mounted on a tape carrier package (TCP). In addition, a printed circuit board (PCB) 20 is connected to the first substrate of the display panel 10 via the TCP.

The GIP type gate driving circuit includes a level shifter LS mounted on the PCB 20 and a shift register SR disposed on the first substrate of the display panel 10.

The level shifter LS receives signals such as a start pulse ST, gate shift clocks GCLK, a flicker signal FLK and so on as well as driving voltages such as a gate high voltage VGH and a gate low voltage VGL from the timing controller TC. The start pulse ST, the gate shift clocks GCLK and the flicker signal FLK may be signals that swing between 0 V and 3.3 V, but are not limited thereto. The gate high voltage VGH is a voltage equal to or higher than the threshold voltage of the thin film transistors TFT formed in the thin film transistor array of the display panel 10, and may be approximately 28V. The gate low voltage VGL is a voltage lower than the threshold voltage of the thin film transistors TFT, and may be approximately −5 V. But the gate high voltage VGH and gate low voltage are not limited thereto.

The level shifter LS level-shifts the start pulse ST and the gate shift clocks GCLK from the timing controller TC to the gate high voltage VGH and the gate low voltage VGL to obtain shift clock signals CLK, and outputs the shift clock signals CLK. Therefore, a start pulse VST and the shift clock signals CLK output from the level shifter LS swing between the gate high voltage VGH and the gate low voltage VGL, respectively. The level shifter LS can reduce flicker by lowering the gate high voltage according to the flicker signal FLK to lower a kickback voltage Vp of the liquid crystal cell.

As shown in FIG. 4, the output signals of the level shifter LS are supplied to the shift register SR via wirings formed in the PCB 20 to pass through a first source drive IC SDa positioned at a left top of the display panel 10, and line-on-glass (LOG) wirings LW formed on the first substrate of the display panel 10. The shift register SR may be formed directly on the first substrate of the display panel 10 by a GIP process.

As shown in FIG. 5, the start pulse VST, the clock signals CLK1 to CLKn, the gate low voltage VGL and the gate high voltage VGH are input to the shift register SR. The shift register SR includes a plurality of stages ST1 to STn that are connected in a cascade manner. The clock signals CLK1 to CLKn are n phase clock signals of which phases are sequentially delayed (where n is a natural number of 2 or more). The clock signals CLK1 to CLKn are supplied to the stages ST1 to STn through the clock signal supply lines SL1 to SLn, respectively.

Figure 6:
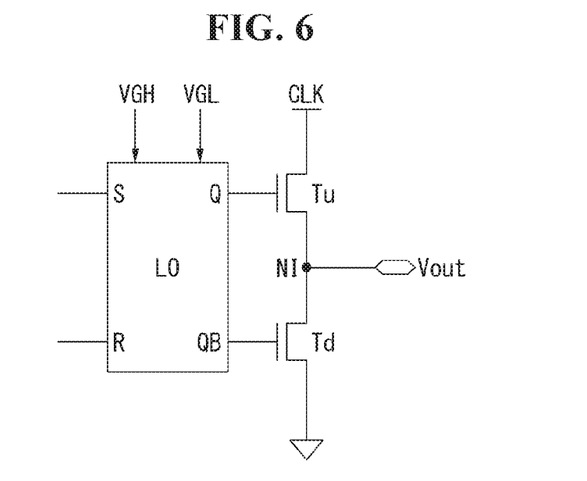
FIG. 6 is a circuit diagram showing a stage of the shift register of FIG. 5.

Each of the stages ST1 to STn includes a logic unit Lo, a pull-up TFT Tu, and a pull-down TFT Td as shown in FIG. 6.

Referring to FIG. 6, the logic unit Lo includes a set terminal S to which the start signal VST or a carry signal from a previous stage is input, a reset terminal R to which a reset signal is input, a first output (or "Q node") controlling the pull-down TFT Td, and a second output (or "QB node") controlling the pull-down TFT Td.

The logic unit Lo controls charging and discharging operations of the Q node and the QB node in response to the gate start signal VST, the gate high voltage VGH, and the gate low voltage VGL.

The pull-up TFT Tu includes a gate electrode connected to the Q node, a source electrode that receives the clock signal CLK, and a drain electrode connected to an output node N1.

The pull-down TFT Td includes a gate electrode connected to the QB node, a source electrode connected to a wire supplying the gate low voltage VGL, and a drain electrode connected to the output node N1.

The Q node and the QB node are charged and discharged opposite to each other. That is, when the Q node is charged to an activation level, the QB node is discharged to a deactivation level. Conversely, when the Q node is discharged to the deactivation level, the QB node is charged to the activation level.

More specifically, when the Q node is activated, the pull-down TFT Td is turned off, as the QB node is deactivated, and the pull-up TFT Tu is turned on to output any one of the shift clock signals CLK1 to CLKn as a scan pulse. The scan pulse becomes the gate voltage Vout that is output to the corresponding gate line and is used as a carry signal supplied to the next stage. On the other hand, when the QB node is activated, the pull-up TFT Tu is turned off, as the Q node is deactivated, and the pull-down TFT Td is turned on, so that the gate voltage of the gate line is sensed and supplied to the wire for supplying the gate low voltage VGL.

The logic unit Lo of each of the stages ST1 to STn in the shift register SR includes a plurality of TFTs for controlling activation and deactivation of the Q node and the QB node. Among these TFTs, the TFTs that control the Q node and that affect the gate output characteristic are subject to Q node stress. When they are subjected to stress for a long time, the TFTs do not operate due to an increase of the threshold voltage caused by the stress, which may result in the gate signal not being output.

In embodiments provided by the present disclosure, in order to solve the above-described problems caused by such stress, light is irradiated onto the active layer made of an oxide semiconductor in the shift register SR, thereby preventing the threshold voltage value of the TFT from being shifted to an increased value.

Hereinafter, a configuration for applying a predetermined amount of light to the thin film transistors in the shift register SR will be described in detail with reference to FIG. 7.

FIG. 7 is a cross-sectional view showing a path through which light is introduced into a thin film transistor of the GIP circuit (e.g., a TFT of the shift register) of the liquid crystal display device according to one or more embodiments of the present disclosure.

Since all of the thin film transistors formed in the shift register SR have the same layer structure, only one thin film transistor is shown in FIG. 7 for simplification of description.

Referring to FIG. 7, a liquid crystal display device according to one or more embodiments of the present disclosure includes a thin film transistor array TFTA, a color filter array CFA, and a backlight unit BLU.

The shift register SR of the thin film transistor array TFTA includes a thin film transistor T, a transparent electrode SP and an opaque electrode line SL.

The thin film transistor T disposed in the shift register SR of the thin film transistor array TFTA includes a gate electrode GE disposed on one surface of the first substrate SUB1, a gate insulating film GI covering the gate electrode GE, a semiconductor active layer A disposed on a surface of the gate insulating film GI covering the gate electrode GE, and a source electrode SE and a drain electrode DE which are separated from each other by a certain distance on a surface of the semiconductor active layer A so as to expose a part of the semiconductor active layer A between the source and drain electrodes SE, DE. The semiconductor active layer A forms a channel layer connecting the source electrode SE and the drain electrode DE in accordance with the voltage applied to the gate electrode GE.

The source electrode SE, the semiconductor active layer A and the drain electrode DE of the thin film transistor T are sequentially covered with an interlayer insulating film INT and a first passivation layer PAS1.

The transparent electrode SP disposed in the shift register SR of the thin film transistor array TFTA is positioned on a surface of the first passivation layer PAS1. The transparent electrode SP is disposed in the bezel area BA of the display panel (i.e., in the shift register SR) and may be disposed on a same layer as the common electrode is disposed in the active area AA. The transparent electrodes SP disposed in the shift register SR of the bezel area BA are electrically separated from the common electrode 1 disposed in the active area AA, but may be formed in a same layer and thus may be aligned with, but separate from, the common electrode 1.

The opaque electrode line SL disposed in the shift register SR of the thin film transistor array TFTA is disposed on a surface of the transparent electrode SP so as to directly contact the transparent electrode SP. The opaque electrode line SL is supplied with the gate low voltage VGL. That is, the opaque electrode line SL is connected to the wire for supplying the gate low voltage VGL and extends to each of the stages ST1 to STn of the shift register SR. The opaque electrode line SL is disposed on the same layer as the common line branch CLb for applying a common voltage Vcom to the common electrode COM to form an electric field with the pixel electrodes 1 disposed in the active area AA. But, the opaque electrode line SL is electrically separated from the common line CL and the common line branch CLb. The opaque electrode line SL may be a line arranged to overlap or be overlapped by the semiconductor active layers A of the thin film transistor T contained in each of the stages ST1 to STn. The width of the opaque electrode line SL may be formed to be substantially equal to the width of the semiconductor active layer A of the thin film transistor T. The opaque electrode line SL is formed of an opaque metal material having good conductivity. The opaque electrode line SL not only protects the semiconductor active layer A by blocking light directly irradiated to the semiconductor active layer A but also reduces a resistance of the transparent electrode SP formed of a transparent conductive material.

The color filter array CFA includes a second substrate SUB2 arranged to face the first substrate SUB1 and a black matrix BM formed on a surface of the second substrate SUB2 facing the first substrate SUB. An opening OP is formed in the black matrix BM and has a dimension that is larger than a corresponding dimension of the active layer A of the thin film transistor T disposed in the shift register SR. For example, as shown in FIG. 7, the opening OP may have a width that is wider than the width of the active layer A. Similarly, the area of the opening OP may be larger than the area of the active layer A. Moreover, the opening OP may be larger in dimension, e.g., width, than a corresponding dimension of the opaque electrode line SL. The black matrix BM may be formed of a material having a property that absorbs light.

The backlight unit BLU irradiates light to the color filter array CFA.

In the active area AA, the light irradiated to the color filter array CFA passes through the color filters of the color filter array CFA, and then passes through the pixel area of the thin film transistor array TFTA so that an image is displayed on the display panel. In the bezel area BA, the light irradiated to the color filter array CFA reaches the thin film transistor array TFTA through the opening OP formed in the black matrix BM. The opaque electrode line SL for blocking light is disposed in the shift register SR located in the bezel area BA of the thin film transistor array TFTA. Accordingly, the light incident through the opening OP of the black matrix BM is mostly blocked by the opaque electrode line SL. That is, since the width of the opaque electrode line SL is formed to be substantially equal to the width of the semiconductor active layer A of the thin film transistor T, and since the opaque electrode line SL is aligned with the active layer A, the light incident through the opening OP of the black matrix BM is blocked by the opaque electrode line SL and is not directly irradiated to the semiconductor active layer A.

However, since the opening OP of the black matrix BM is formed to have a larger size than the opaque electrode line SL, some of the light emitted by the backlight unit BLU passes into the thin film transistor array TFTA through regions between edges of the black matrix and side surfaces of the opaque electrode line SL and the transparent electrode SP. The light may be redirected, for example, in the first passivation layer PAS1, toward the semiconductor active layer A. As a result, the light introduced through the regions between the edges of the black matrix and the side surfaces of the opaque electrode line SL and the transparent electrode SP is indirectly irradiated to the semiconductor active layer A due to reflection, diffraction, or the like.

Therefore, since the semiconductor active layer A made of oxide is irradiated indirectly by the light introduced from the backlight unit, it is possible to obtain an effect of improving the PBTS characteristics of the thin film transistor T without adversely affecting the semiconductor oxide due to the influence of light.

Figure 8:
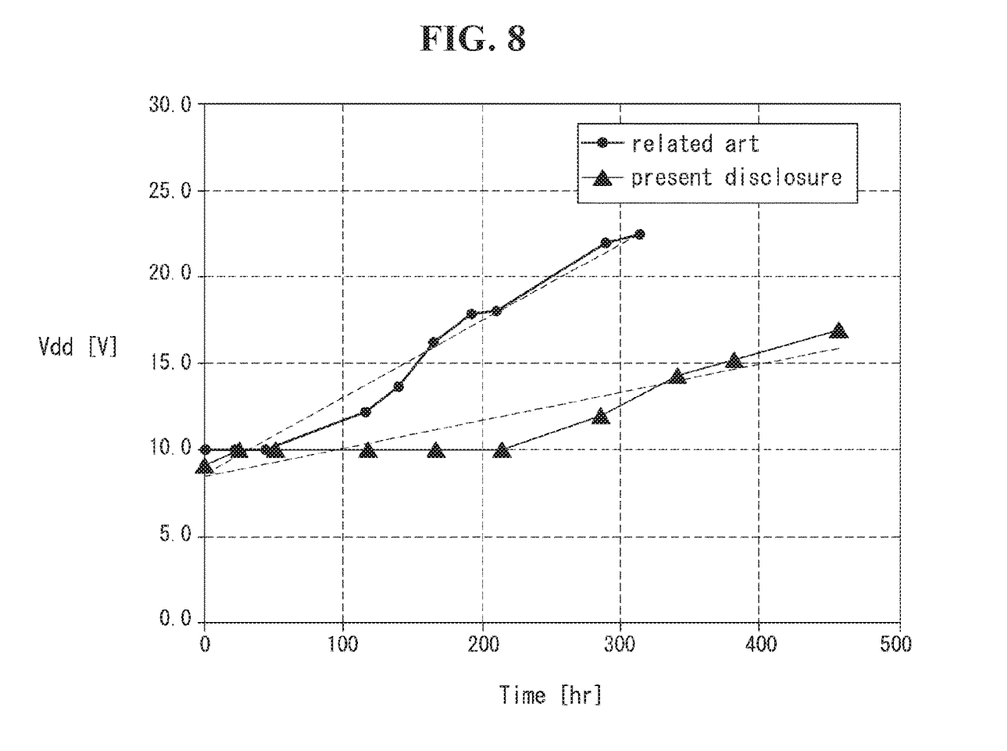
FIG. 8 is a graph showing variations of the threshold voltage value of the thin film transistor of the GIP circuit over time in the related art liquid crystal display device and in the liquid crystal display device according to embodiments of the present disclosure.

FIG. 8 is a graph showing variations of the threshold voltage value of the thin film transistor of the GIP circuit over time in the related art liquid crystal display device and in the liquid crystal display device according to embodiments of the present disclosure.

Referring to FIG. 8, in the related art liquid crystal display device, the driving voltage for driving the thin film transistor of the shift register is required to be about 22 V after a driving time of 300 hours has elapsed. However, in the liquid crystal display device according to the present disclosure, it can be seen that the threshold voltage of the thin film transistor is not substantially shifted, as the driving voltage for driving the thin film transistor of the shift register is only about 12V after a same driving time of about 300 hours has elapsed.

Therefore, according to the liquid crystal display device provided by the various embodiments of the present disclosure, since the light supplied from the backlight unit flows into the semiconductor active layer constituting the thin film transistor of the shift register formed in the GIP type gate driving circuit, it is possible to improve the PBTS characteristic, thereby increasing the reliability of the gate drive circuit.

Those skilled in the art will understand that the present disclosure may be changed and modified in various ways without departing from the technical spirit of this disclosure through the aforementioned contents. Accordingly, the technical scope of this disclosure is not limited to the contents described in the detailed description of the specification, but should be determined by the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
a first substrate including a thin film transistor of a gate in panel (GIP) circuit disposed in a bezel area positioned outside of an active area on which an image is displayed, and an opaque electrode line that overlaps a semiconductor active layer of the thin film transistor;
a backlight unit; and
a second substrate between the backlight unit and the first substrate, the second substrate including a black matrix having an opening configured to transmit light emitted from the backlight unit through the second substrate,
wherein, in operation, the opaque electrode line blocks a portion of the light transmitted through the opening of the black matrix, and another portion of the light transmitted through the opening of the black matrix is transmitted to the semiconductor active layer.

2. The liquid crystal display device of claim 1, wherein the opening of the black matrix has a width that is greater than a width of the opaque electrode line.

3. The liquid crystal display device of claim 2, wherein the width of the opaque electrode line is substantially equal to a width of the semiconductor active layer.

4. The liquid crystal display device of claim 2, wherein the light transmitted to the semiconductor active layer is indirectly transmitted to the semiconductor active layer by reflection or diffraction.

5. The liquid crystal display device of claim 1, wherein the thin film transistor is disposed on the first substrate, and the opaque electrode line is disposed to be in direct contact with a transparent electrode disposed on a passivation layer that covers the thin film transistor.

6. The liquid crystal display device of claim 5, wherein the transparent electrode is disposed in the bezel area and is electrically isolated from a common electrode disposed in the active area.

7. The liquid crystal display device of claim 6, wherein the opaque electrode line applies a gate low voltage to the transparent electrode.

8. The liquid crystal display device of claim 5, wherein the light transmitted to the semiconductor active layer is transmitted between edges of the black matrix and side surfaces of both the opaque electrode line and the transparent electrode.

9. The liquid crystal display device of claim 1, wherein the light transmitted to the semiconductor active layer is transmitted between edges of the black matrix and side surfaces of the opaque electrode line.

10. The liquid crystal display device of claim 1, wherein the thin film transistor is included in a shift register of the GIP circuit.

11. A device, comprising:
a first substrate;
a thin film transistor on the first substrate, the thin film transistor including an active layer, and source and drain electrodes on the active layer, a portion of the active layer being exposed between the source and drain electrodes;
a first passivation layer on the thin film transistor;
an opaque electrode line on the first passivation layer;
a second substrate; and
a black matrix on the second substrate and positioned between the second substrate and the opaque electrode line, the black matrix including an opening having a width that is greater than a width of the opaque electrode line,
wherein the opaque electrode line is disposed between the thin film transistor and the black matrix, and
wherein the opaque electrode lines forms a light blocking region that blocks light emitted through the opening of the black matrix, and wherein light transmissive regions are formed between edges of the black matrix that at least partially form the opening and edges of the opaque electrode line.

12. The device of claim 11, further comprising a transparent electrode between the first passivation layer and the opaque electrode line.

13. The device of claim 12, wherein the transparent electrode has a same width as the opaque electrode line, and is substantially aligned with the opaque electrode line.

14. The device of claim 11, further comprising a second passivation layer on the opaque electrode line, and between the opaque electrode line and the second substrate.

15. A device, comprising:
a first substrate;
a thin film transistor on the first substrate, the thin film transistor including an active layer, and source and drain electrodes on the active layer, a portion of the active layer being exposed between the source and drain electrodes;
an opaque electrode line overlapping the exposed portion of the active layer;
a second substrate; and
a black matrix on the second substrate, the black matrix including an opening that overlaps the opaque electrode line, the opening having an area that is greater than an area of the opaque electrode line.

16. The device of claim 15, further comprising a backlight unit, the second substrate being positioned between the opaque electrode line and the backlight unit.

17. The device of claim 16, wherein, in operation, the opaque electrode line is configured to block a first portion of light emitted by the backlight unit, and a second portion of the light is transmitted between side surfaces of the black matrix and side surfaces of the opaque electrode line.

18. The device of claim 17, further comprising a passivation layer between the opaque electrode line and the active layer, wherein the second portion of the light is transmitted through the passivation layer to the exposed portion of the active layer.

19. The device of claim 15, further comprising a liquid crystal layer between the second substrate and the opaque electrode line.

* * * * *